May 8, 1951            J. THÉVENAZ            2,552,299
FILM RETAINER FOR CINEMATOGRAPH SPROCKETS
Filed March 31, 1945            2 Sheets-Sheet 1
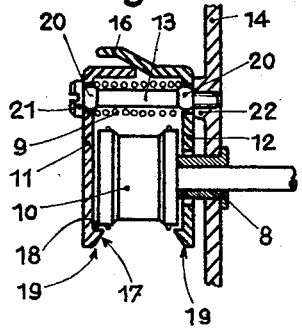
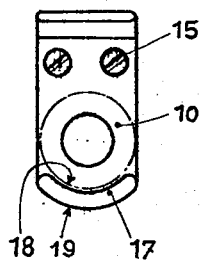
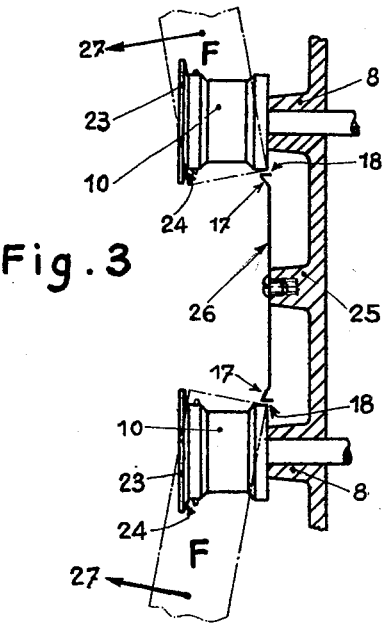
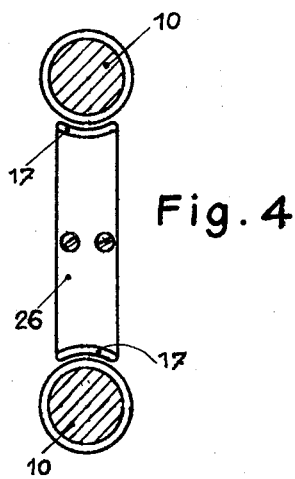
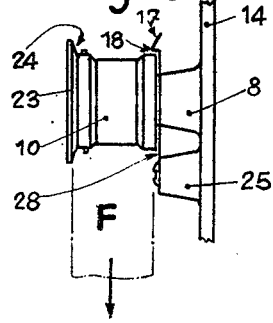
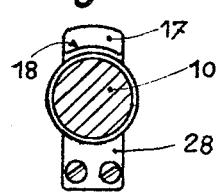
INVENTOR
JEAN THÉVENAZ,
BY
ATTORNEY May 8, 1951 J. THEVENAZ 2,552,299
FILM RETAINER FOR CINEMATOGRAPH SPROCKETS
Filed March 31, 1945 2 Sheets-Sheet 2
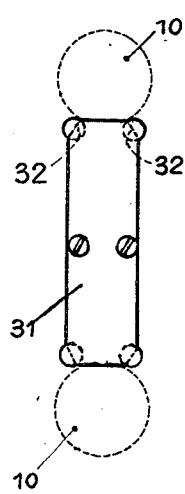
Fig. 8
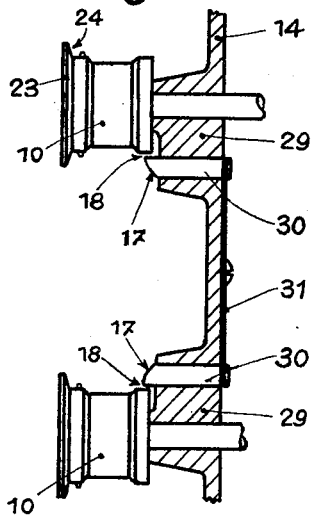
Fig. 7
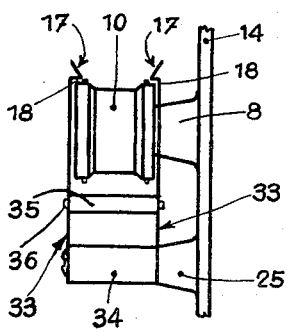
Fig. 9
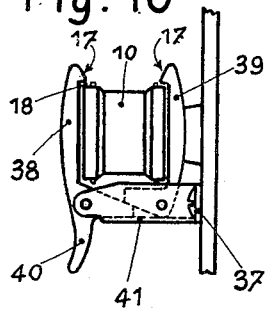
Fig. 10
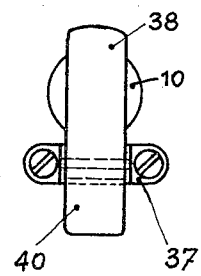
Fig. 11
INVENTOR
JEAN THEVENAZ,
BY Emery R. Groff
ATTORNEY Patented May 8, 1951

2,552,299

UNITED STATES PATENT OFFICE 2,552,299

FILM RETAINER FOR CINEMATOGRAPH SPROCKETS

Jean Thévenaz, Sainte-Croix, Switzerland, assignor to Paillard S. A. (Paillard A. G., Paillard Limited), a corporation of Switzerland Application March 31, 1945, Serial No. 585,850
In Switzerland May 24, 1944

4 Claims. (Cl. 271—2.3)

In the known types of cinematograph apparatus the film is moved by means of feeding rollers or sprocket spools provided with one or two rows of teeth which engage with perforations in the margin of the film. The film is kept against each feeding roller by means of spring members which are generally provided with one or more rollers cooperating with the feeding roller.

In practice, the operation of placing the film in position on the feeding rollers or sprocket spools is one which cannot be effected without difficulty. In fact, it is not easy, without a certain degree of skill, to get the film to take up the correct position in which the teeth of the sprocket spool engage with the perforations, because it is always necessary to employ one hand to keep open or to operate the spring members cooperating with the sprocket spool.

The object of the present invention is to eliminate the inconveniences mentioned above. For this purpose, at least one of the supporting surfaces of the feeding roller for the film cooperates, in order to keep the latter in position, with at least one member situated normally opposite this supporting surface, but capable of being momentarily withdrawn from it under the action of a force.

The accompanying drawing shows diagrammatically, by way of example, some forms of execution of the object of the invention.

Fig. 1 is an elevation, partly in section, of one form of invention.

Fig. 2 is a view of a detail.

Figs. 3 to 11 show other forms of invention.

Referring to Figs. 1 and 2 of the drawing, the propelling roller or sprocket spool 10 is arranged between the side plates 11 and 12 which are supported by pins 13 rigidly connected to the frame 14 of the apparatus. The axle of the propelling roller or sprocket spool turns in a bearing 8 rigidly secured to the frame 14 and passing through the side plate 12. The openings 15 in the side plates, through which the pins 13 pass, are of greater diameter than the pins 13, which are fitted at that point with swivels or knuckle joints 20 so as to allow oscillation of the side plates 11 and 12 with respect to the central plane of the sprocket spool.

A spring 9 arranged on each pin 13 tends to push the side plates 11 and 12 into the position shown on the drawing, that is to say respectively against the head of a screw 21 and against a projection 22 on the frame 14.

Above the pins 13 the side plates 11 and 12 are bent at a right angle. The plate 11 ends near the central plane of the propelling roller or sprocket spool, whilst the plate 12 has a part 16 covering the end of plate 11.

It is evident that by exerting thrust on the part 16, the two side plates 11 and 12 are caused to swivel simultaneously on the spherical collars of the knuckle joint 20 of the pins 13, so that their free ends move away from the central plane of the propelling roller or sprocket spool.

The free ends of each side plate have each an inclined surface 17 and a surface 18 for guiding the film. As can be seen in the drawing in Fig. 1, the latter surface serves to keep the edge of the film in place, once the teeth have engaged with the perforations.

The inclined surfaces 17 are such that the parts where they are nearest to each other are near the propelling roller or sprocket spool. Their outer edges 19 are separated by a distance greater than the width of the film strip.

The springs 9 are chosen of such tension as to allow the side plates 11 and 12 to move apart when a strip of film is held with its edges resting on the surfaces 17. It can then be understood that the operation of putting the film in place on the propelling roller or sprocket spool can be effected simply by placing it opposite to the latter between the surfaces 17 and giving it a slight pull upwards. The two side plates then move apart and the edges of the film slide in between the propelling roller or sprocket spool and the surfaces 18. It then suffices to displace the film longitudinally till the teeth of the propelling roller or sprocket spool enter the perforations in the margin of the film.

To release the film from the propelling roller or sprocket spool, a thrust is exerted on the part 16 of the side plate 12, thus causing the two side plates to move apart. The film is then free.

In the form of invention shown in Figs. 3 and 4, the axles of the propelling rollers or sprocket spools 10 are journaled in the bearings 8 rigidly mounted on the frame 14. Each propelling roller or sprocket spool carries at its further end from the bearing 8 a disc 23 which is of greater diameter than the roller and whose edge projecting beyond the periphery of the roller has a tapered surface 24 starting from the periphery of the roller.

Between the two propelling rollers or sprocket spools 10, the frame 14 has a projection 25 carrying a spring blade 26, each end of which is opposite the supporting surface of a propelling roller or sprocket spool at the end opposite the disc 23. Each end of the blade 26 is curved in a plane parallel to the supporting surface of the propelling roller or sprocket spool so as to constitute a guiding surface 18, to which is connected an inclined surface 17.

The parts nearest together of the inclined surfaces 17 and 23 are separated by a distance which is less than the width of the film strip F.

It is evident that to bring the film on to the propelling roller or sprocket spool 10, it is sufficient to rest the film on the surfaces 17 and 23 and to exert a slight pull which makes the blade 26 bend in the plan of the axle of the propelling roller or sprocket spool until the moment when the edge of the strip slids in between the supporting surface of the propelling roller or sprocket spool and the guiding surface 18. A slight longitudinal displacement of the film strip ensures at once that the teeth engage with the perforations.

To remove the film from the propelling rollers or sprocket spools, it is displaced obliquely to the side of the disc 23 (into the position shown by the broken lines in Fig. 3). The film can then be withdrawn laterally in the direction of the arrows 27.

Figs. 5 and 6 show an arrangement similar to that described above. The propelling roller or sprocket spool 10 is identical with those described with reference to Figs. 3 and 4. The difference consists in the fact that the axle (not shown) of the propelling roller or sprocket spool passes through the spring blade 28 secured to the boss 25 on the frame 14. The free end of the spring blade carries an inclined surface 17 and a guiding surface 18 as in the preceding form. It functions in identically the same manner as described.

In the form of invention shown in Figs. 7 and 8, the arrangement of the propelling rollers or sprocket spools and their shape are identical with those described with reference to Figs. 3 and 4.

Nevertheless the bosses 29 constituting the bearings of the propelling rollers or sprocket spools are large enough to contain the receiving holes of four sliding pins or pistons 30, whose ends opposite the propelling rollers or sprocket spools, are subjected to the action of a spring blade 31, fixed to the frame 14. The ends of this spring blade fit into recesses 32 at the ends of the piston (Fig. 8). The latter are of such dimensions that they project from their holes, the ends coming over the propelling rollers or sprocket spools and opposite the surfaces intended to support the film. The end of each sliding pin or piston is provided with an inclined surface 17 and also a part 18 for guiding the film.

The functioning is practically the same as that described with reference to Figs. 3 and 4, the ends of the sliding pins or pistons replacing the ends of the spring blade 26.

Fig. 9 shows a form of invention in which two spring blades 33 are arranged beside the two opposite lateral faces of a propelling roller or sprocket spool 10 whose axle rotates in a boss 8 on the frame 14. The two spring blades 33 are fixed on a boss 25 and separated by a spacing piece 34. Between their fixing point and the propelling roller or sprocket spool they carry a second spacing piece 35 whose ends 36 slide in holes of the spring blades. The length of these two spacing pieces 34 and 35 practically corresponds to the width of the propelling roller or sprocket spool 10.

Each end of the spring blades 33 carries an inclined surface 17 and a guiding surface 18, as described with reference to Figs. 5 and 6.

The functioning of these spring blades 33 is practically identical with that of the side plates 11 and 12 described with reference to Figs. 1 and 2 as far as concerns bringing the film into place. To remove it from the propelling roller or sprocket spool, it is sufficient to bring the outer spring laterally away from the propelling roller or sprocket spool and then withdraw the film as shown in Fig. 3.

Figs. 10 and 11 show a form of invention with one propelling roller or sprocket spool 10. Near the latter a support 37 is secured to the frame 14. On this support are hinged two bent levers 38 and 39, the former of which carries an extension 40. One of the arms of each of these levers extends over one of the lateral faces of the propelling roller or sprocket spool, that of the lever 39 being passed through by the axle of the roller (but not shown). The end of each of these arms is shaped similarly to the ends of the side plates described with reference to Figs. 1 and 2, with an inclined surface 17 and a guiding surface 18.

The bent part of each of these levers 38 and 39 is arranged opposite the peripheral surface of the propelling roller or sprocket spool 10 and the arm of the lever 38 engages the end of the arm of lever 39, these two being kept normally in the position shown in the drawing by a spring plate 41 rigidly connected to the support 37.

As in the form of invention first described, exerting a thrust on the extension 40 of the lever 38, the two levers are caused to swivel against the force of the spring acting on them, thus causing their ends to be drawn away from the supporting surfaces on the propelling roller or sprocket spool 10, so that the film placed on the latter can be removed. For putting the film into position, the functioning is the same as that described with reference to Figs. 1 and 2.

I claim:

1. The combination with a film feeding sprocket spool and its shaft, of supporting shafts parallel to and spaced from the sprocket spool shaft, means pivotally supported from the supporting shafts having inward extensions overlapping the sprocket spool rims to retain and guide the film on the sprocket spool, single spring means on each shaft urging the latter means into sprocket spool overlapping position, and single actuator means for simultaneously pivoting said pivotally supported means to retracted position thereby uncovering the sprocket spool rim to permit removal of the film.

2. The combination with a film feeding sprocket spool and its shaft, of supporting shafts parallel to and spaced from the sprocket spool shaft, means pivotally supported from the supporting shafts having inward extensions overlapping the spool rims to secure the film on the sprocket spool, single spring means on each shaft urging the latter means into sprocket spool overlapping position, single means for simultaneously pivoting the said pivotally supported means to retracted position thereby uncovering the sprocket spool rims to permit removal of the film, the ends of the said pivotally supported means having inclined ends by means of which film pressed thereagainst will spread the said pivotally supported means against the tension of the spring means to permit the insertion of film.

3. The combination with a film feeding spool and its shaft, of supporting shafts parallel to and spaced from the spool shaft, plates pivotally supported from the supporting shafts and having inward extensions overlapping the spool rims to retain and guide the film on the spool, single spring means on each of the supporting shafts urging the plates into spool overlapping position, and single actuator means for simultaneously pivoting said plates to retracted position and thereby uncovering the spool rims to permit the removal of film.

4. The combination with a film feeding sprocket spool and its shaft, of supporting shafts parallel to and spaced from the sprocket spool shaft, plates pivotally supported from the supporting shafts and having inward extension overlapping the sprocket spool rims to secure to film on the sprocket spool, single spring means on each of the supporting shafts urging the plates into sprocket spool overlapping position, said plates having coacting abutting lugs, whereby displacement of one of the lugs displaces the other lug and pivots said plates to retracted position, thereby retracting the overlapping extensions to uncover the spool rims and permit the removal of film.

JEAN THÉVENAZ.

REFERENCES CITED

The following references are of record in the file of this patent:

UNITED STATES PATENTS

| Number | Name | Date |
| --- | --- | --- |
| 1,621,024 | Oiler | Mar. 15, 1927 |
| 2,205,546 | Stechbart | June 25, 1940 |
| 2,377,756 | Calvin et al. | June 5, 1945 |

FOREIGN PATENTS

| Number | Country | Date |
| --- | --- | --- |
| 582,658 | Germany | Aug. 21, 1933 |
| 269,140 | Great Britain | May 3, 1928 |